No. 803,124. PATENTED OCT. 31, 1905.
G. T. McENEANY.
EYEGLASS CONNECTION.
APPLICATION FILED MAY 25, 1905.

WITNESSES:

INVENTOR
G. T. McEneany
By James Sheehy, Attorney

UNITED STATES PATENT OFFICE.

GEORGE THOMAS McENEANY, OF NEW YORK, N. Y.

EYEGLASS CONNECTION.

No. 803,124.  Specification of Letters Patent.  Patented Oct. 31, 1905.

Application filed May 25, 1905. Serial No. 262,158.

*To all whom it may concern:*

Be it known that I, GEORGE THOMAS MCENEANY, a citizen of the United States, residing at New York, in the county of New York and State of New York, have invented new and useful Improvements in Eyeglass Connections, of which the following is a specification.

My invention pertains to eyeglass connections—i. e., means for connecting the nose-spring and the nose-guards of a pair of eyeglasses together and to the lenses; and it consists in the peculiar and advantageous connection hereinafter described and claimed.

Figure 1:
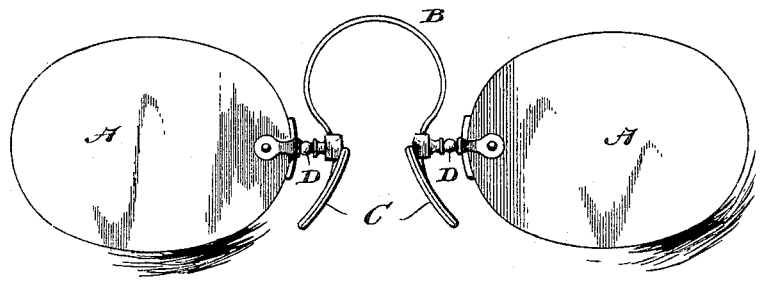
Figure 2:
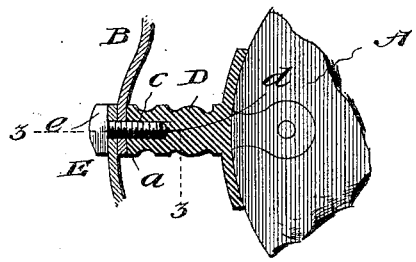
Figure 3:
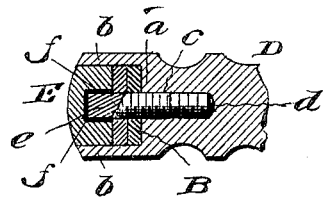

In the accompanying drawings, forming part of this specification, Figure 1 is an elevation of a pair of pince-nez eyeglasses embodying my novel connections. Fig. 2 is an enlarged detail vertical section illustrative of one of the connections, and Fig. 3 is a section taken in the plane indicated by the line 3 3 of Fig. 2.

Similar letters designate corresponding parts in all of the views of the drawings, referring to which—

A A are the lenses of a pair of pince-nez eyeglasses.

B is is the nose-spring, and C C are the nose-guards. These parts may be and preferably are of the ordinary well-known construction.

D D are the posts which constitute parts of my novel connections. These posts may be and are illustrated as connected to the lenses A in the conventional manner, though they may be connected in any other manner compatible with the purpose of my invention without involving a departure from the scope thereof. Each post D is provided with a flat enlargement *a*, located at the end of the post remote from the lens complementary thereto, angular flanges *b* on opposite edges of the said enlargement *a*, and a threaded bore or socket *c*, occupying the longitudinal center of the post and extending from the inner end of the post outwardly or toward the lens thereon.

In addition to a post D my novel connections respectively comprise a screw E, having a threaded shank *d*, designed to extend through the nose-spring B and a guard C and into the threaded socket *c* of the post, and a square head *e*, having a socket in its hidden side receiving and soldered to the shank *d*, as indicated by *f*. The said head *e* is designed to assume a position between the flanges *b* and its opposite flat sides contact therewith.

In assembling the parts entering into each of my novel connections the nose-spring B and the guard C are arranged between the flanges *b* of the post D, and the screw E is turned through the spring and the guard and into the threaded socket *c* of the post D, while the flanges *b* are inclined slightly outward and until the square head *e* of the screw rests between the said flanges *b*. When the head of the screw is in the position stated, the flanges *b* are bent inwardly and tight against opposite flat sides of the said head. With this done it will be observed that the several parts constitute a solid connection, that there is no liability of any one of the parts working loose, and that the connection is strong and durable and yet simple, compact, and neat in appearance.

It will be gathered from the foregoing that the screw-shank and the post are connected, and the screw-head and the post are locked together of themselves—i. e., without the employment of extraneous devices—and that this contributes largely to the simplicity and durability of the connection.

The soldering of the square head *e* of the screw to the threaded shank thereof permits of the head being formed of gold or other precious and comparatively soft metal, as is desirable, in order to add to the finish of the glasses, and also permits of the shank of the screw being formed of steel or other material calculated to retain its thread and securely hold the several parts described to the post.

As shown in the drawings, the edges of the flanges *b* and the exposed side of the screw-head *e* are preferably rounded in order to render the same more comfortable to the wearer of the eyeglasses.

Having described my invention, what I claim, and desire to secure by Letters Patent, is—

In an eyeglass connection, the combination of a lens, a post connected to the lens and having flanges on opposite edges of its end remote from the lens and also having a longitudinal central threaded bore extending from the said end, a nose-spring and a nose-guard arranged side by side and between the flanges of the post; and a screw comprising a threaded shank extending through the nose-spring and the nose-guard and into the threaded bore in the post, and a square head having a socket in its hidden side receiving and soldered to the end of the shank and also having opposite flat sides arranged against the inner sides of the flanges on the post.

In testimony whereof I have hereunto set my hand in presence of two subscribing witnesses.

GEORGE THOMAS McENEANY. [L. S.]

Witnesses:
O. HOFFRITZ.
MERRICK S. GERR.